Aug. 17, 1965

J. M. TOPAZ 3,200,723

SHUTTER TIMING APPARATUS

Filed March 29, 1963

INVENTOR.
Jeremy M. Topaz
BY Brown and Mikulka
ATTORNEYS

Aug. 17, 1965 J. M. TOPAZ 3,200,723
SHUTTER TIMING APPARATUS
Filed March 29, 1963 2 Sheets-Sheet 2

INVENTOR.
Jeremy M. Topaz
BY Brown and Mikulka
ATTORNEYS

United States Patent Office 3,200,723
Patented Aug. 17, 1965

3,200,723
SHUTTER TIMING APPARATUS
Jeremy M. Topaz, Brighton, Mass., assignor to Polaroid Corporation, Cambridge, Mass., a corporation of Delaware
Filed Mar. 29, 1963, Ser. No. 269,000
18 Claims. (Cl. 95—11.5)

This invention relates to control of the duration of photographic exposures and more specifically to novel means for reducing discrepancies between an ideal exposure time and the actual exposure time as determined by operation of the exposure control mechanism.

Many photographic shutters are provided with means for varying, either selectively by manual control or automatically in response to the intensity of light from the scene being photographed, the time period during which light from the scene is allowed to impinge upon the photographic film. It is also common to provide means for operating the shutter in cooperation with a transient light source which raises the level of scene illumination for purposes of making an exposure. The light output from conventional transient photographic lighting sources, while relatively high in intensity at short distances, is limited in duration. Consequently, the mechanical movement of the shutter to initiate exposure is synchronized in some way with the transient light output from the source. Hereinafter, such lighting sources will be referred to as "photoflash apparatus," which term is intended to comprise the usual vaporizable filament flash bulbs as well as gaseous discharge tubes, tungsten filament bulbs to which a momentary overload is applied, and other such devices which are operable to substantially raise the level of scene illumination in cooperation with operation of the shutter to effect exposure.

The timing means provided to control the duration of exposure is often so coupled to the shutter means which move to initiate and terminate exposure that the time period, established by operation of the timing means, begins before actual initiation of the exposure, and ends before the exposure is actually terminated. That is, upon actuation of the timing means to begin the timing operation there is a slight delay before the exposure aperture is actually uncovered to admit light. Likewise, at the termination of the time period established by the timing means, there is a second delay before the exposure aperture is actually covered to terminate exposure. If the required exposure time is calculated in accordance with the light received from the scene during the timing period, that is, the time from actuation of the timing means to termination of the time period established thereby, a proper exposure should result if the above-mentioned delays are equal in duration and the level of scene illumination remains substantially constant during the exposure. Since this is the usual condition when the scene is illuminated by natural light, or by artificial light of substantially constant intensity, the use of such a system is not objectionable. However, when exposures are made of a scene illuminated by photoflash apparatus, errors in exposure may result. The exact nature of such errors, as well as that of the above-mentioned time delays, and cooperation between timing means, shutter and photoflash apparatus operation will be explained in greater detail hereinafter with reference to the accompanying drawings and graphs.

A principal object of the present invention is to provide novel means which serve to reduce or eliminate errors in the duration of exposures effected by photographic shutters under the control of a timing means.

It is a further object to provide means selectively operable to advance termination of the exposure timing interval, thereby reducing exposure errors which would otherwise result.

Another object is to provide, in a photographic shutter having timing means for establishing the duration of exposures in response to the intensity of light received from the scene being photographed, means operable to alter the operating characteristics of the device when used with photoflash apparatus, thus reducing exposure errors which result if the photoresponsive mechanism has been calibrated to operate properly when scene illumination is of substantially constant intensity.

A still further object is to provide, in a shutter wherein exposure duration is controlled by a light-integrating switching circuit, means selectively operable to reduce the amount of light required to trigger the circuit to cause termination of the exposure, thus reducing or eliminating errors in the amount of light which is allowed to impinge upon the film when the scene is illuminated by photoflash apparatus.

Still another object is to provide, in a shutter wherein exposure begins after initiation of a time period and ends after and in response to termination of the time period and the exposure duration is established in accordance with the amount of light received from the scene during the time period, means for reducing or eliminating errors which result from having a substantially higher level of scene illumination at the end of the exposure than at the beginning.

Other objects of the invention will in part be obvious and will in part appear hereinafter.

The invention accordingly comprises the apparatus possessing the construction, combination of elements and arrangements of parts which are exemplified in the following detailed disclosure, and the scope of the application of which will be indicated in the claims.

For a fuller understanding of the nature and objects of the invention, reference should be had to the following detailed description taken in connection with the accompanying drawings wherein.

Figure 1:
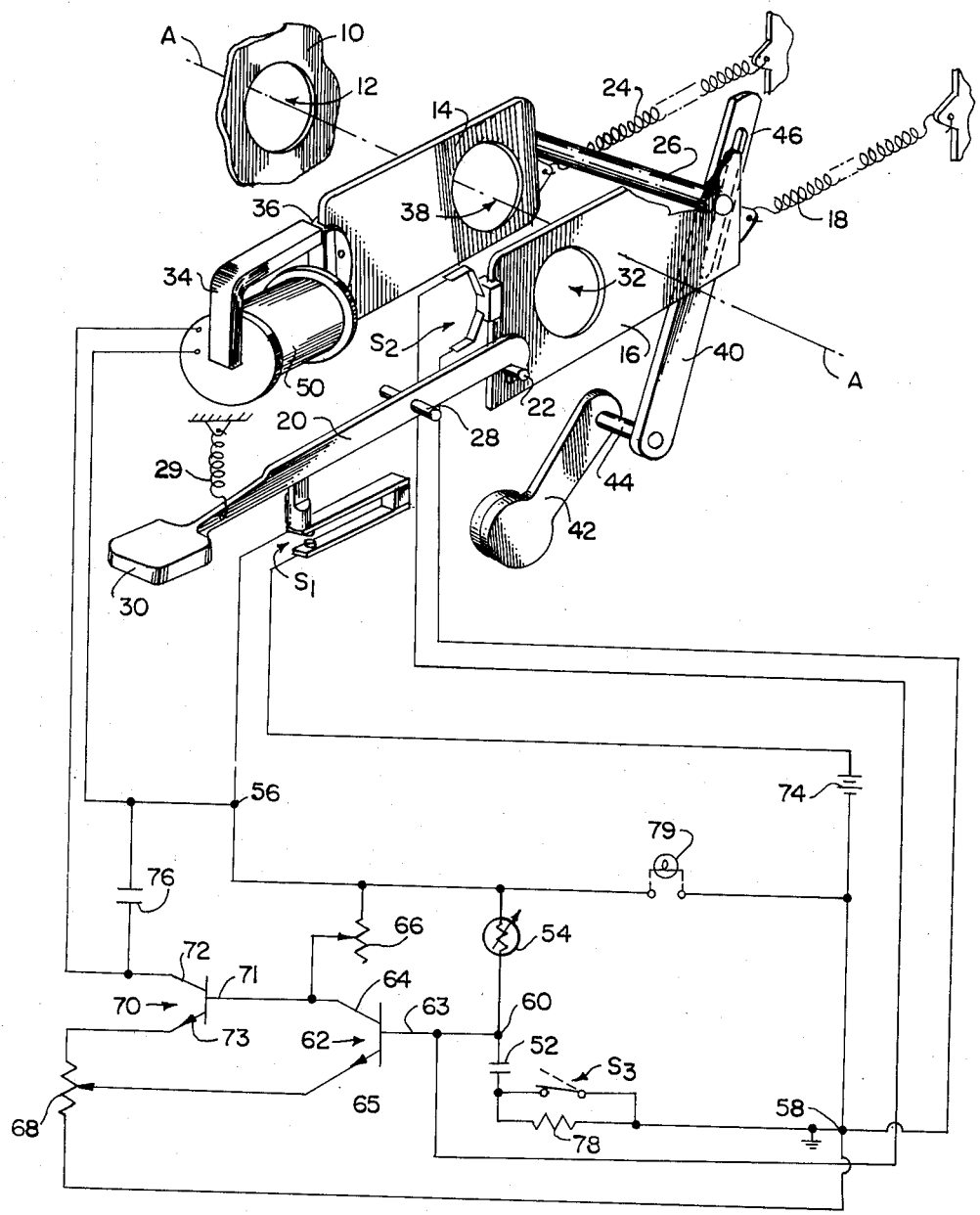
FIGURE 1 is a somewhat diagrammatic, fragmentary, perspective view of means defining an exposure aperture and shutter means movable with respect thereto to effect photographic exposures coupled with a schematic circuit diagram of suitable electronic means for controlling the duration of exposures of the shutter and wherein the present invention is employed.

The present invention will be discussed in connection with a typical photographic shutter having a light-integrating switching circuit adapted to control the duration of exposures effected by the shutter. Although the shutter mechanism and circuit of FIGURE 1 are typical of the type of device wherein the present invention is suited for use, it will be understood from the following description that the invention is not limited in its application to any particular type or configuration of the exposure control device. For this reason, the shutter mechanism is shown in FIGURE 1 with a minimum of detail.

Referring now to the drawings, in FIGURE 1 is seen a fragment 10 of a shutter housing, lens board, camera body or other such means commonly used to define an exposure aperture 12, having a centrally-disposed axis A—A. A pair of shutter blades 14 and 16 are slidably mounted upon a suitable support means (not shown) for movement relative to aperture 12. As shown in FIGURE 1 the elements of the shutter are in the set or cocked position. Blade 16 is retained in the cocked position against the bias of spring 18 by latch 20, which engages pin 22 on blade 16. Blade 14 is retained in the cocked position against the bias of spring 24 by contact of a leading edge of blade 14 with bar 26 which extends rigidly from blade 16. Latch 20 is mounted for pivotal movement about pin 28 and is biased toward its latching position by spring 29. Manual depression of end portion 30 rotates latch 20 until it disengages pin 22. Blade 16 is thus allowed to move to a second position (not shown) wherein opening 32 is in alignment with axis A—A. Blade 14 is retained in the position of FIGURE 1 by the attractive force exerted by electromagnet 34 on a magnetizable element or keeper 36 which is attached to the trailing edge of blade 14. Electromagnet 34 is energized and deenergized to restrain and permit movement of blade 14 by the operation of the circuit, which will be explained later.

When blade 16 is in its second position and blade 14 is in its initial position, light from a scene being photographed is allowed to pass through exposure aperture 12, through opening 38 in blade 14, and opening 32 in blade 16 to impinge upon a photographic film or the like (not shown) for the purpose of effecting a photographic exposure. When electromagnet 34 is deenergized, blade 14 is allowed to move to a second position (not shown) wherein a solid portion of the blade is in alignment with the axis A—A and blocks the passage of light through exposure aperture 12, thus terminating the exposure.

A cocking or reset mechanism is provided for returning the shutter elements to the position of FIGURE 1. The cocking mechanism is in the form of a crank having arms 40 and 42, extending rigidly from pivotally mounted pin 44. Arm 40 includes an elongated slot 46 which embraces bar 26. Thus, the crank will be rotated by movement of blade 16 to its second position. The unpivoted end of arm 42 may be manually rotated to cause rotation of arm 40, and thus movement of blade 16 against the bias of spring 18. Continued rotation of arm 42 returns both blades to the position of FIGURE 1 wherein they are again retained by latch 20. It will be noted that when blade 16 is held by latch 20, blade 14 is maintained by bar 26 in such a position that keeper 36 is in contact with the pole pieces of electromagnet 34.

The time for which the film is exposed by light entering through exposure aperture 12 is substantially the time between arrival of blade 16 at its second position and the movement of blade 14 to its second position. Since movement of blade 14 away from its initial position is controlled by electromagnet 34, the timing means for controlling exposure duration may comprise suitable means for deenergizing electromagnet 34 at the proper time. In the embodiment illustrated in FIGURE 1 the timing means comprises a transistorized, modified, Schmitt-type trigger circuit for controlling a current supply through coil 50, which provides the energization of electromagnet 34. This circuit provides rapid switching of the current input to coil 50 and low power consumption.

The timing portion of the circuit comprises capacitor 52 connected in series with photoresponsive element 54, which may be any of a number of such elements conventionally used as light-measuring devices in photographic apparatus. For purposes of the present discussion element 54 will be considered to be of the photoconductive type, such as a cadmium sulfide photoconductor, or the like, disposed to receive light from the scene being photographed and having a resistance functionally related to the level of scene brightness. Also, in order to simplify examples of circuit operation to be considered hereinafter, the electrical property of element 54 which is related to the intensity of light incident thereon may sometimes be the resistance and at other times the conductance, which is the reciprocal of the resistance.

The timing portion just described is connected, through switches to be later described, between terminals 56 and 58 so as to form a conventional integrator circuit whose input terminal is at 56, and whose output terminal is at 60, the connection between capacitor 52 and element 54. The response of this portion of the circuit to a step-function voltage input is a time-varying voltage output at terminal 60. Where there is no initial charge on capacitor 52, the time $t_1$ required for the voltage at terminal 60 to reach a value $V_1$ is given by:

$$t_1 = RC \ln \frac{1}{1 - \frac{V_1}{E_0}} \quad (1)$$

where R is the resistance of the photoconductive element 54, as established by the intensity of light incident thereon, C is the capacitance of capacitor 52, and $E_0$ is the magnitude of the step-function voltage input.

The voltage-sensitive trigger circuit includes switching means such as transistor 62 having base, collector and emitter electrodes 63, 64 and 65 respectively. Base electrode 63 is connected to terminal 60, the voltage output of the timing means. Collector electrode 64 is connected to terminal 56 through variable bias resistor 66, and emitter electrode 65 is connected to terminal 58 through variable bias resistor 68. A second transistor 70 includes base, collector and emitter electrode 71, 72 and 73 respectively. Collector electrode 72 is connected to terminal 56 through coil 50 and emitter electrode 73 is connected through bias resistor 68 to terminal 58, so that electromagnet 34 is energized when transistor 70 conducts. It should be noted that with this arrangement there is essentially a common emitter resistor 68, the adjustment thereof being for the purpose of establishing the voltage at which it is desired to trigger the circuit.

The circuit includes a source of electrical power, shown in the form of battery 74 of potential $E_0$, connected from terminal 56 to terminal 58 through switch S1, which is commonly opened to minimize current drain on battery 74. The contacts of switch S1 are closed by manual depression of end portion 30 of latch 20 which, as previously described, releases blade 16 to initiate exposure. The amount of movement of latch 20 required to close switch S1 is less than the amount required to release blade 16, so that the switch will always be closed before blade 16 begins to move, for reasons which will later become apparent.

The operation of the shutter means in moving to initiate and terminate exposure, and the associated operation of the timing circuit to control the duration of the exposure, will now be described. As the operator depresses end portion 30, latch 20 moves to close the terminals of switch S1. Transistor 70 conducts almost instantaneously with the closing of switch S1 because at the instant of closing, the collector-base junction of transistor 70 is reverse biased, causing leakage current to flow through resistor 66, establishing a forward bias on the emitter-base junction. The setting of variable resistor 66 establishes the degree to which transistor 70 conducts so that the current through coil 50 can be adjusted to provide proper magnetomotive force in the magnetic circuit of electromagnet 34 to retain blade 14 in its initial position after blade 16 has moved away from its initial position. The flow of current through resistors 66 and 68, when transistor 70 conducts, establishes at the collector 64 and emitter 65 of transistor 62, bias voltages having first values dependent upon the magnitudes of the respective currents and resistance values.

As latch 20 continues to move after closing switch S1, pin 22 is disengaged, thus leaving blade 16 free to move under the bias force of spring 18. A pair of switch terminals are closed through a portion of blade 16, when the latter is in the cocked position, forming switch S2 which opens upon movement of blade 16 away from the cocked position. At the instant S1 is closed, and until switch S2 is opened the voltage at terminal 60 is ground potential. As above described, the timing means acts liks a conventional integrator circuit. Thus, when a voltage is applied to input terminal 56 by closing switch S1, there appears at output terminal 60, upon opening of switch S2, a voltage which changes from an initial value (in the present example, ground potential) to a preselected value ($V_1$) in a period of time ($t_1$) dependent upon the value of capacitor 52 and the conductance of element 54 as established by the intensity of light received thereby from the scene being photographed. When the voltage at terminal 60 is at it initial value, and the voltages at collector 72 and emitter 73 are at their first values of bias voltage due to the conduction of transistor 70, the collector-base and emitter-base of transistor 62 are reverse biased, thus resulting in transistor 62 being cut off, or nonconducting. When the voltage at output terminal 60 reaches the preselected value $V_1$ which forward biases the emitter-base junction of transistor 62, the latter begins to conduct.

Initially, the increased collector current of transistor 62 flowing through bias resistor 66 increases the voltage drop thereacross to lower the voltage at base electrode 71 of transistor 70. This reduces the forward bias on transistor 70, decreasing the flow of current through the latter, causing the voltage drop across bias resistor 68 to decrease, thereby increasing the forward bias of transistor 62 even more. This regenerative feedback between the steps of the voltage-sensitive trigger circuit causes conduction to switch rapidly from transistor 70 to transistor 62. The different flow of current through bias resistors 66 and 68 due to this switching of transistors establishes second values of bias voltages at collector 64 and emitter 65 of transistor 62. Thus, the conduction of transistor 70 is severely and rapidly reduced by the second values of the aforementioned bias voltages, thereby rapidly deenergizing electromagnet 34 to effect release of blade 14 in the manner previously described. Capacitor 76, shunting coil 50, causes the transient current which flows through the coil to oppose the magnetizing current, sharply decreasing the magnetic induction in electromagnet 34 to zero, thereby accelerating the time required for spring 24 to overcome the magnetic attraction of electromagnet 34 and effecting a clean, sharp release of blade 14. To achieve this regenerative effect, the rapid decrease of current through coil 50 is essential.

For the purposes of the above explanation, switch S3 was considered to be closed at all times, thus bypassing resistor 78. The purpose and effect of moving switch S3 to the open position will be discussed later.

It will be understood from the foregoing explanation that as soon as switch S2 is opened, by movement of blade 16 away from its position of FIGURE 1, the timing operation of the circuit begins. Since the stroke of latch 20 required to close switch S1 is shorter than that required to release blade 16, electromagnet 34 is energized before blade 16 moves and blade 14 will be retained in its initial position upon movement of bar 26 out of contact therewith. Each time an exposure is made, a finite time will elapse between the opening of switch S2 and the alignment of opening 32 with exposure aperture 12 and opening 38 to initiate exposure. This time, hereinafter referred to as the "first time delay," will depend upon the biasing force of spring 18, the friction between blade 16 and its associated supporting elements, and the distance of travel of blade 16 in moving from the cocked position to the exposure-initiating position. The duration of the first time delay may thus be fixed at some desired finite time by proper mechanical design of the elements.

When current through coil 50 is cut off by operation of the switching circuit, electromagnet 34 is deenergized and blade 14 is free to move under the biasing force of spring 24 to its second position. Again, a finite time will elapse between the switching of the circuit and actual termination of exposure by the solid portion of blade 14. This time, hereinafter referred to as the "second time delay," will depend upon the force exerted by spring 24, the decay time of the magnetic field, the inertia and friction of blade 14 and its associated supporting elements, and the distance blade 14 is required to travel to terminate exposure. The second time delay may also be established as desired by design of the elements which affect its duration.

Figure 2A:
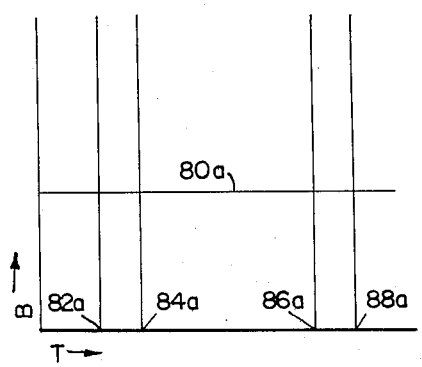
FIGS. 2a–2c are graphical representations of the intensity of light reflected from an assumed scene being photographed by the shutter of FIGURE 1, with respect to time.

In FIG. 2a curve 80a represents graphically the intensity of light (B) received from the scene being photographed, both by the film which is being exposed and by photocell 54, versus time (T). In the case of FIG. 2a the scene is assumed to be illuminated by light which is substantially constant in intensity for the time period involved, whether the light be provided by a natural or an artificial source. Switch S2 opens to begin the timing operation of the circuit at the time represented by point 82a on the horizontal scale. Exposure of the film is initiated by the arrival of blade 16 at its second position at time 84a, the first time delay thus being shown as the elapsed time between points 82a and 84a. Beginning at time 82a the charge on capacitor 52 increases at a rate determined by the conductance of photocell 54, which in turn is a function of the intensity of light received by the cell. Capacitor 52 reaches the predetermined trigger voltage required to cause the circuit to switch off the current through coil 50, as previously explained, as soon as sufficient current has been conducted through photocell 54 to raise the charge to this point. Since the time period established by the circuit is not a function of the light intensity at any fixed point in time, but rather is continuously dependent thereupon during the timing operation, the time period required to reach the trigger voltage may be expressed in terms of the area under curve 80a from point 82a to point 86a, when the circuit switches to terminate the time period. This area may be calculated by taking the integral of curve 80a between the limits 82a and 86a. The quantity thus determined may be termed the "time-integral" of the intensity of light received from the scene being photographed during the time period established by the circuit. The integral of curve 80a between the limits 82a and 84a is the time-integral of scene light intensity or brightness during the first time delay; the integral of the curve between 86a and 88a, when exposure is terminated by movement of blade 14, is the time-integral of brightness during the second time delay. The value of the conductance of photocell 54 may also be plotted as a function of time. The time-integral of this electrical property could also be calculated, in the same manner as above, for any desired time limits. Since the charge on capacitor 52 builds up at a rate dependent on the conductance of photocell 54, the charge at any given time after switch S2 has been opened may be expressed in terms of the time-integral of photocell conductance. Thus, the trigger voltage will be reached at such time as the time-integral of conductance reaches a predetermined amount; with a given functional relationship between conductance and light intensity, this may also be expressed in terms of the time-integral of scene brightness.

It may thus be seen from FIG. 2a that the circuit, which controls exposure time as a function of scene brightness, has begun the timing operation and is thus "measuring the light" before the light is allowed to impinge upon the film. When the time-integral of scene brightness has reached a predetermined amount the trigger voltage is reached, as explained in the preceding paragraph, thus ending the timing operation. During the second time delay, after termination of the timing operation, light still enters the exposure aperture to impinge upon the film until closing blade 14 moves to terminate exposure. Consequently, a certain amount of light (the time-integral during the first time delay) is taken into account by the circuit which controls exposure time but does not impinge upon the film; another amount of light (the time-integral during the second time delay) impinges upon the film but is not taken into account by the circuit. Since the circuit may be so calibrated that the trigger voltage will occur after any desired time-integral of light has been received by the photocell, and since the first and second time delays may be set at any known, fixed duration, the relationship between the operation of the circuit and that of the blades may be established so that automatic operation of the circuit results in proper exposure of the film.

The foregoing explanation has been based upon a number of assumptions which should be pointed out at this time. First of all, it is assumed that the size or area of the exposure aperture and the relative sensitivity, or "speed," of the film being exposed are known values and are fixed for any given exposure so that a proper duration for the exposure may be determined based upon the level of scene brightness. The shutter device disclosed herein may be used with a plurality of film sensitivities if the proper relationship of aperture size and exposure duration is maintained. In connection with the present device this may be accomplished either by providing conventional means for varying the effective exposure aperture, or by changing the functional relationship between the time-integral of scene brightness and the light-responsive means for controlling exposure duration, or both. An example of suitable means for accomplishing this function may be found in U.S. application Serial No. 268,880 of Edwin H. Land et al., for Photographic Apparatus filed of even date herewith.

A second assumption is that the electrical property of the photocell which is related to the intensity of light incident on the cell, in the present example the cell resistance or conductance, changes instantaneously to deflect changes in light intensity. As a practical matter, this condition is seldom achieved. Presently available photoconductive cells which are suitable for photographic applications exhibit a characteristic commonly known as photoconductive lag. The effect of this characteristic on the operation of shutter timing circuits such as the one described herein, as well as means for compensating for exposure errors which may result from it, are discussed in detail in U.S. application Serial No. 268,914, of the present inventor, for Photographic Apparatus filed of even date herewith. The presence of photoconductive lag, however, is not considered with respect to the present invention; to avoid further explanation in the present disclosure it is therefore assumed that the resistance of the cell changes instantaneously with the light intensity.

In the example of FIG. 2a it is assumed that the first time delay is equal in duration to the second time delay. Since the intensity is constant the time-integral of intensity during the timing operation, that is, between points 82a and 86a, is equal to the time-integral during actual exposure, that is, between points 84a and 88a. Therefore, if the circuit is calibrated to trigger when the time-integral of light is equal to that which is required to provide proper exposure for the film being used, the exposure will be of proper duration.

When photoflash apparatus is used to provide illumination for a scene being photographed, it is necessary to synchronize in some way the operation of the camera shutter with the light output from the apparatus due to the limited duration of the output. The two most common methods of synchronization, known as M-synch and X-synch, are dependent to some extent on the burning characteristics of the bulb used, or in other words, the light output curve of the source.

Figure 2B:
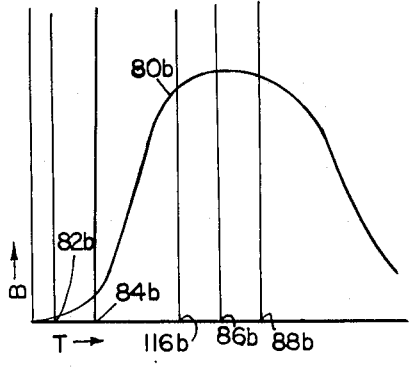

In FIG. 2b curve 80b illustrates the intensity of light with respect to time on a scene illuminated by a typical photoflash light source. The operation of the shutter is "X-Synchronized" with the light output from the source; that is, the shutter and light source are actuated at substantially the same time so that the shutter opens to begin exposure before any appreciable amount of light has been emitted by the source. As in the example of FIG. 2a, the shutter is actuated by rotation of latch 20, first closing switch S1 and then releasing blade 16. Bulb 79, which may selectively be included in the circuit as indicated in FIGURE 1, will receive power from battery 74 upon closing of switch S1. Movement of blade 16 opens switch S2 to begin the timing operation at the time indicated by the numeral 82b. Actual exposure of the film begins when blade 16 arrives at its second position, blade 14 being retained in its initial position by electromagnet 34, at time 84b. When the charge on capacitor 52 reaches the trigger voltage the circuit switches off the current through coil 50, as previously explained. This will occur when the area under curve 80b, beginning at time 82b, reaches the predetermined value which has been calculated to provide proper exposure. Thus, the area under curve 80b between the times represented by the point 82b and 86b will be equal to the area under curve 80a between the times 82a and 86a. The first and second time delays, being independent of light intensity, are the same in the example of FIG. 2b as in FIG. 2a.

It may be readily seen that, although the areas under curves 80a and 80b are equal during the timing operation, they are not equal during actual exposure. This is due to the fact that a great deal more light is emitted by the photoflash apparatus during the second time delay (from 86b to 88b) than during the first time delay (from 82b to 84b). Therefore, although the circuit has been properly calibrated to trigger at the precise time that the light reflected from the scene is sufficient to provide proper exposure, the film will be overexposed by an amount represented by the difference in areas under curve 80b during the first and second time delays. Since the shutter and photoflash apparatus are X-synchronized the area under the curve during the first time delay is quite small, the error thus being substantially equal to the area under the curve during the second time delay. To repeat, the circuit has been calibrated to trigger when the light received by the photocell, beginning with opening of switch S2, is the amount required to properly expose the film. When the light is provided by photoflash apparatus which is X-synchronized with shutter operation, the film has received substantially all the light which the photocell has received by the time the circuit triggers because very little light is received during the first time delay. Consequently, the film has received substantially enough light for proper exposure when the circuit triggers at time 86b and the additional amount received during the second time delay results in overexposure.

Figure 2C:
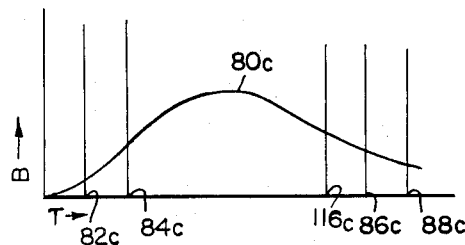

The intensity of the light reflected to the camera by the scene when the latter is illuminated by photoflash apparatus is dependent on the distance from the light source to the scene. FIG. 2c shows a light intensity-time curve 80c for a scene further removed from the light source than the scene of FIG. 2b. Again, the timing operation is commenced by opening of switch S2 at time 82c, the exposure is initiated at time 84c, the circuit triggers at 86c, and exposure is terminated at 88c. It may be readily seen that, although the amount of light received during the first time delay (82c to 84c) is still quite small, the light received by the film during the second time delay (86c to 88c) is much less than that received during the second time delay when the light source is closer to the scene (86b to 88b). Therefore, the amount of error is seen to be proportional to the distance from the light source to the scene, since it is this factor which determines the amount of light received by the film during the second time delay. Although the figures have been exaggerated for purposes of illustration, it is assumed that since the circuit operation has not been changed, the time-integral of light required to trigger the circuit is the same. The area under curve 80c between points 82c and 86c is therefore equal to the area under curve 80b between points 82b and 86b.

Figure 3A:
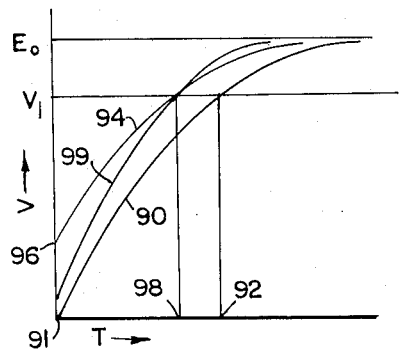
FIGS. 3a and 3b are graphical representations of the change in voltage with respect to time at an output terminal of the circuit of FIGURE 1 showing the effect of the present invention thereon.

Turning now to FIG. 3a, curve 90 represents the manner in which the voltage (V) at terminal 60 (or, the charge on capacitor 52) increases with respect to time (T) in response to the application of a step-function voltage upon opening of switch S2 at time 91. Curve 90 exponentially approaches $E_0$, the potential of battery 74, reaching the value $V_1$, the preselected trigger voltage, at time $t_1$ (Equation 1), represented by point 92. Comparing FIG. 3a with, for example, FIG. 2a, time 91 corresponds to time 82a and time 92 corresponds to time 86a, the former pair being the time at which switch S2 is opened to initiate the timing operation and the latter being the time at which the circuit triggers, terminating the time interval established by the circuit. The rate at which the charge on capacitor 52 increases is dependent upon the value of the capacitance of capacitor 52 and the resistance of photocell 54 as determined by the light intensity. The product of these values (RC) is commonly known as the time constant and will vary only upon changes in light intensity when the timing portion of the circuit includes only capacitor 52 and photocell 54. Thus, as the light intensity changes a different time constant results, due to the change in resistance of photocell 54, and the rate of change of the voltage (that is, the slope of curve 90) changes accordingly so that the trigger voltage $V_1$, is reached at a different time for each level of intensity. It is again pointed out, however, that the value of the time-integral of light intensity (that is, the area under the intensity-time curve during the timing operation) is the same in each case, the time required to reach this value of course varying in accordance with the level of intensity.

Returning to FIGURE 1, it may be seen that if switch S3 is open during the timing operation, fixed resistance 78 will be in series with capacitor 52. The resistances of both photocell 54 and resistor 78 will then have an effect on the time constant. Instead of being equal to the product of capacitance and photocell resistance only, the time constant at any given level is now equal to $(R+r)C$, where R is the resistance of photocell 54 and r is the resistance of fixed resistor 78. The time $t_2$ required to reach the trigger voltage $V_1$ is expressed:

$$t_2 = (R+r)C \ln \frac{\frac{R}{R+r}}{1-\frac{V_1}{E_0}} \quad (2)$$

Curve 94 of FIG. 3a illustrates the effect of changing the time constant from RC to $(R+r)C$ when resistance r is included in the circuit and R and C have the same values as in the case of curve 90. The inclusion of resistor 78 in the circuit obviously increases the time constant at the same light level, but since a peak current flows through the circuit as soon as switch S2 is opened, photocell 54 and resistor 78, being on opposite sides of output terminal 60, act as a voltage divider. An initial voltage will therefore appear at output terminal 60 substantially at the instant switch S2 is opened. This initial voltage ($V_2$) will be dependent upon the values of the two resistances on either side of output terminal 60 and may be expressed:

$$V_2 = \frac{r}{r+R}E_0 \quad (3)$$

Thus, rather than changing from an initial value of zero, the initial value of voltage at terminal 60 has the value determined by Equation 3 which is indicated in FIG. 3a as point 96. The time at which the voltage reaches the trigger voltage $V_1$ when resistor 78 is included in the circuit is represented by reference numeral 98. It may thus be seen that by including resistor 78 in the circuit triggering is advanced by a time equal to the difference between points 92 and 98.

It was assumed for purposes of explanation in FIG. 3a that the value of R was constant during the timing operation. That is, the light received by photocell 54 from the scene being photographed was substantially constant in intensity. If the intensity changes considerably during the timing operation, as when the scene is illuminated by photoflash apparatus, the value of R of course varies accordingly. Since the intensity of light from the photoflash apparatus varies continuously with the respect to time as indicated in FIGS. 2b and 2c, the resistance of photocell 54 also becomes a function of time and Equations 1 and 2 no longer apply as a means of calculating the time required to reach the trigger voltage. However, if the value of the trigger voltage is properly established for a constant value of R, the circuit will trigger at the proper time even though the light intensity, and consequently the photocell resistance, are variable with respect to time. Therefore, if the device is operated with photoflash apparatus and the time required for the circuit to trigger is measured, Equations 1 or 2 (depending on whether or not resistor 78 is in the circuit) may be solved for R. In this manner an "effective" value for R may be determined for the particular manner in which light intensity varied with respect to time during circuit operation. This effective value of R will correspond to an effective steady value of light intensity. Therefore, the present discussion is simplified by considering R and light intensity to have effective values, corresponding to constant values, although actually a function of time.

From Equation 3 it may be seen that the value of initial voltage $V_2$ at output terminal 60 when resistor 78 is in the circuit is dependent upon the value of photocell resistance R at the time switch S2 is opened. This is determined by the intensity of light from the scene prior to initiation of exposure which may be expected to be quite low when photoflash apparatus is required. The initial value of R is, therefore, high at the moment when exposure is initiated and continues to drop as the light reflected by the scene from the photoflash apparatus increases in intensity. The effective value of R over the period of exposure will be somewhere between the actual values at initiation and termination of exposure. The actual voltage-time curve would be more closely approximated by curve 99 for photoflash operation when photocell resistance has an effective value during the exposure interval which is represented by curve 94. Although the slope of curve 99 is somewhat higher than that of curve 94, the timing period is still terminated at time 98.

Figure 3B:
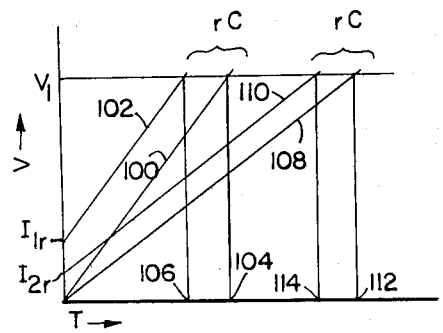

A comparison of the effect which resistor 78 has on the timing operation of the circuit at various intensities of illumination may be seen in FIG. 3b. The voltage-time curves of FIG. 3b are represented as straight lines for ease of comparison, although it will be understood that the actual increase in voltage with respect to time is more nearly approximated by curves having the shape of those in FIG. 3a. The voltage increase would bear a linear relationship to time if the current at terminal 60 were constant. Although the current, as well as the voltage, changes with respect to time it will be noted that the shape of the curves of FIG. 3a during the timing period only, i.e., between time 91 and the time at which $V_1$ is reached, is approximately linear. Therefore, the curves of FIG. 3b may be considered to be substantially representative of the voltage-time relationship.

Curve 100 of FIG. 3b represents the voltage increase with respect to time at terminal 60 when the intensity of light received by photocell 54 has a first value, which will establish the value of photocell resistance and, consequently, the current. The light intensity either is constant for the curves of FIG. 3b or, if changing, is assumed to have an effective value during the timing period which corresponds to a constant value from which photocell resistance and current may be calculated. When resistor 78 is not included in the circuit, the voltage increases from an initial value of zero, as indicated by curve 100 which will have a slope equal to $$\frac{I_1}{C}$$

where $I_1$ is the effective current value during the timing period when the light intensity has said first value and C is the value of capacitor 52. The trigger voltage $V_1$ is reached at the time represented by point 104.

If resistor 78, having a value $r$, is included in the circuit, at the same first value of light intensity the voltage-time curve will be represented by curve 102, the slope of which is also $$\frac{I_1}{C}$$

Curves 100 and 102 are therefore parallel, the voltage having an initial value equal to $I_1 r$ in the case of curve 102. The time at which the trigger voltage $V_1$ is reached is represented by point 106 in the case of curve 102. The difference between times 104 and 106 is $rC$, which may be seen by subtracting the equations for the two curves.

Curve 108 represents the voltage change with respect to time when the intensity of light has a second value, lower than the first value which resulted in curves 100 and 102. The lower light intensity results in a higher value of photocell resistance, thus a lower current ($I_2$) and slower voltage rise. The slope of curve 108 is $$\frac{I_2}{C}$$

and the trigger voltage is reached at time 112. Curve 110 illustrates the effect of including resistor 78 in the circuit when the light intensity is of the said second value, i.e., the same as in the case of curve 108. Again, curve 110 will have the same slope as curve 108 and the voltage will have an initial value of $I_2 r$. Since the equations of curves 108 and 110 are the same as those of curves 100 and 102, with the exception of the difference in values of $I_1$ and $I_2$, the time required to reach trigger voltage $V_1$ is reduced by the same amount by including resistor 78 in the circuit. Thus, the time between points 114 and 112 is the same as that between points 106 and 104, and it is seen that, subject to the foregoing assumptions, the time required to reach the trigger voltage is reduced by the same amount ($rC$) by including resistor 78 in the circuit regardless of light intensity. If the value of $rC$, that is, the product of the resistance of fixed resistor 78 and the capacitance of capacitor 52, is chosen to equal the second time delay of the shutter blades, the shutter will close at the time when it would normally trigger if resistor 78 were not in the circuit.

Relating this information to FIGS. 2b and 2c, it is seen that by including resistor 78 in the circuit, that is, by opening switch S3, triggering will occur at time 116b and 116c, respectively. The second time delay, being mechanical in nature, is the same in either case. Thus, actual termination of exposure takes place subsequent to triggering by a time equal to the second time delay. Since the value of $rC$ was chosen to equal the second time delay triggering has been advanced from times 86b and 86c by this amount and actual termination, rather than triggering, occurs at times 86b and 86c. As previously explained, the amount of light received by the film when photoflash apparatus is used is substantially sufficient for proper exposure at the time when triggering occurs when resistor 78 is not in the circuit. It is therefore evident that advancing the triggering time by a time substantially equal to the second time delay causes automatic termination of exposure at the proper time.

Through the choice of proper values and characteristics for the various electrical components of the circuit and the correlation thereof with the mechanical design and operation of the shutter, the operator is thus assured of a properly exposed photograph each time the device is operated. When the intensity of the light received from the scene being photographed is substantially constant, as when "ambient" light is used, the device is operated with switch S3 closed so that resistor 78 has no effect on the timing properties of the circuit. Calibration of the circuit is effected before operation so that triggering occurs when the time-integral of light received by photocell 54 is that amount required for proper exposure. When the scene is to be illuminated by light which varies in intensity during exposure, as when photoflash apparatus is used, switch S3 is opened prior to operation of the device so that resistor 78 will be included in the circuit and effect the previously-described changes in the timing properties thereof. Switch S3 may be operated manually, as by placing a movable control member at some convenient location on the camera or shutter housing in any well-known manner. Inclusion of resistor 78 will decrease the time required to reach the trigger voltage with the same time-integral of light, (or, in other words, a lesser time-integral of light is required to effect triggering) thus reducing or eliminating the exposure error which would otherwise result due to the unwanted light received by the film during the second time delay when photoflash apparatus is used.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. In a photographic camera adapted to make exposures illuminated either by light of substantially constant intensity or by photoflash apparatus, the combination comprising:

means defining an exposure aperture;

shutter means movable with respect to said aperture to initiate and terminate exposures therethrough;

first means operable to actuate said shutter means to initiate said exposures;

second means operable in response to termination of said time interval to actuate said shutter means to terminate said exposure;

timing means adapted to establish a time interval between operation of said first and second means, said time interval corresponding to that time between initiation and termination of exposure which results in a desired amount of light passing through said aperture when said light is of substantially constant intensity;

means for so synchronizing the movement of said shutter means with operation of said second means that upon operation of the latter a time delay occurs before actual termination of said exposures; and compensating means selectively operable to shorten said time interval, whereby said time interval, after adjustment by said compensating means, results in substantially said desired amount of light passing through said aperture when said light is provided by photoflash apparatus.

2. In a photographic camera adapted to make exposures of a scene illuminated either by a light of substantially constant intensity or by photoflash apparatus, the combination comprising:

means defining an exposure aperture;

shutter means movable with respect to said aperture to initiate and terminate exposures therethrough;

first means operable to actuate said shutter means to initiate said exposures;

means for operating photoflash apparatus substantially simultaneously with operation of said first means when such apparatus is used to illuminate said scene;

timing means operable to establish a time interval;

second means operable to actuate said timing means to initiate said time interval substantially simultaneously with operation of said first means;

third means operable in response to termination of said time interval to actuate said shutter means to terminate said exposures;

the movement of said shutter means being so synchronized with operation of said first and third means that a first time delay occurs between operation of said first means and actual initiation of said exposures, and a second time delay occurs between operation of said third means and actual termination of said exposures, said first and second time delays being substantially equal in duration; and compensating means operable when photoflash apparatus is used to advance termination of said time interval by such an amount that substantially the same amount of light passes through said aperture when said scene is illuminated by light of substantially constant intensity as when it is illuminated by said photoflash apparatus.

3. In a photographic camera adapted to make exposures of a scene illuminated either by light of substantially constant intensity or by photoflash apparatus, the combination comprising:

means defining an exposure aperture;

shutter means movable with respect to said aperture to initiate and terminate exposures therethrough;

first means operable to actuate said shutter means for movement to initiate said exposures;

a photosensitive element arranged to receive light from said scene and having an electrical property the value of which is functionally related to the intensity of said light;

capacitive means connected with said photosensitive element to form a photoresponsive timing circuit, said capacitive means being chargeable from an initial voltage to a predetermined voltage when electrical power is supplied thereto in a time interval determined by at least the values of said electrical property and said capacitive means;

means for supplying said electrical power to said capacitive means to initiate said time period substantially simultaneously with operation of said first means;

second means operable in response to said voltage reaching said predetermined value to actuate said shutter means to terminate said exposures;

means for so synchronizing the movement of said shutter means to initiate and terminate said exposures with operation of said first and second means that a first time delay occurs between operation of said first means and actual initiation of said exposures, and a second time delay occurs between operation of said second means and actual termination of said exposures, said first and second time delays being substantially equal in duration;

third means operable to actuate photoflash apparatus not sooner than substantially simultaneously with operation of said first means when such apparatus is used, whereby said light received by said photosensitive element during said first time delay is an essentially negligible portion of the total light emitted by said photoflash apparatus; and compensating means selectively includable in said circuit to change the electrical parameters thereof in such a way as to reduce said time period, by a time substantially equal to said second time delay, whereby operation of said compensating means when said photoflash apparatus is used serves to terminate said exposures after substantially the same amount of light has passed through said aperture as when scene light is of constant intensity and said compensating means is inoperable.

4. In a photographic camera adapted to make exposure of a scene illuminated either by ambient light or by photoflash apparatus, the combination comprising:

means defining an exposure aperture;

a first shutter blade movable from a blocking to an unblocking position with respect to said aperture to initiate an exposure therethrough;

means for retaining said first blade in said blocking position;

first actuating means for releasing said first blade from said blocking position for movement to said unblocking position;

second actuating means for actuating photoflash apparatus when such apparatus is used to illuminate the scene being photographed;

a photosensitive element arranged to receive light from said scene and having an electrical property whose value is functionally related to the intensity of said light;

capacitive means adapted to be charged from an initial voltage when electrical power is supplied thereto to a predetermined voltage in a time period which is a function of the values of said electrical property and said capacitive means;

means for supplying electrical power to said capacitive means to initiate said time period;

a second shutter blade movable from an unblocking to a blocking position with respect to said aperture to terminate said exposure;

means for retaining said second blade in said unblocking positions;

third actuating means operable in response to said capacitive means reaching said predetermined voltage to release said second blade from said unblocking position for movement to said blocking position;

means for so synchronizing the movement of said first and second blades and the operation of said first, second and third actuating means that said time period is initiated substantially simultaneously with actuation of said photoflash apparatus and said exposure is initiated a first fixed time thereafter, and said exposure is terminated a second fixed time after termination of said time period;

a fixed electrical resistance; and switching means operable to include said resistance in series with said capacitive means whereby the time required to reach said predetermined voltage is shortened, thereby advancing said termination of said exposure when said resistance is included in said circuit.

5. In a photographic camera having an exposure aperture and shutter means movable with respect thereto to effect exposure of a photographic film or the like both when the scene being photographed is illuminated by ambient light and when it is illuminated by light from photoflash apparatus, the combination comprising:

photoresponsive timing means adapted to establish a time period which bears a functional relationship to the time-integral of the intensity of light received thereby from said scene after initiation of said time period;

means for moving said shutter means to initiate an exposure a first fixed time after initiation of said time period;

means for moving said shutter means to terminate said exposure a second fixed time after, and in response to, termination of said time period;

said first and second fixed times being substantially equal in duration whereby the time from initiation to termination of exposure is substantially equal to the time from initiation to termination of said time period;

means for so establishing said functional relationship that said time-integral of light received during said time period corresponds substantially to that time-integral of light required to properly expose said film when said scene is illuminated by ambient light; and compensating means selectively operable to so alter said functional relationship that the time integral of light received during said time period is less than that required to properly expose said film.

6. The invention according to claim 5 wherein said compensating means so alters said functional relationship that the time-integral of light received during said second fixed time, when added to said time-integral of light received during said time period, corresponds more closely to that amount require to properly exposed said film than does said time-integral of light received during said time period alone.

7. In a photographic camera having exposure aperture and shutter means movable with respect thereto to effect exposure of a photographic film or the like both when the scene being photographed is illuminated by ambient light and when it is illuminated by light from photoflash apparatus, the combination comprising:
timing means including a photosensitive element arranged to receive light from said scene and adapted to establish the duration of a time period which bears a functional relationship to the time-integral of the intensity of light received by said element after initiation of said time period;
means for actuating said timing means to initiate said time period;
means for moving said shutter means to initiate an exposure a first fixed time after initiation of said time period;
means for moving said shutter means to terminate said exposure a second fixed time after, and in response to, termination of said time period;
said first and second fixed times being substantially equal in duration whereby the time-integral of light received by said element during said first fixed time is substantially equal to the time-integral of light received by said film during said second fixed time when said scene is illuminated by ambient light;
means for so synchronizing actuation of photoflash apparatus with initiation of said time period that the time-integral of light received by said element during said first fixed time is appreciably less than the time-integral of light received by said film during said second fixed time when said scene is illuminated by light from photoflash apparatus;
means for so establishing said functional relationship that said time-integral of light received by said element during said time period corresponds substantially to the time-integral of light required to properly expose said film; and
compensating means selectively operable to so alter said functional relationship that termination of said time period is advanced, whereby said time-integral of light received during said time period is less than said time-integral of light required to properly expose said film.

8. In a photographic camera having exposure aperture and shutter means movable with respect thereto to effect exposure of a photographic film or the like both when the scene being photographed is illuminated by ambient light and when it is illuminated by light from photoflash apparatus, the combination comprising:
timing means including a photosensitive element arranged to receive light from said scene and adapted to establish the duration of a time period which bears a functional relationship to the time-integral of the intensity of light received by said element after initiation of said time period;
means for actuating said timing means to initiate said time period;
means for moving said shutter means to initiate an exposure a first fixed time after initiation of said time period;
means for moving said shutter means to terminate said exposure a second fixed time after, and in response to, termination of said time period;
said first and second fixed times being substantially equal in duration whereby the time-integral of light received by said element during said first fixed time is substantially equal to the time-integral of light received by said film during said second fixed time when said scene is illuminated by ambient light;
means for so synchronizing actuation of photoflash apparatus with initiation of said time period that the time-integral of light received by said element during said first fixed time is appreciably less than the time-integral of light received by said film during said second fixed time when said scene is illuminated by light from photoflash apparatus;
means for so establishing said functional relationship that said time-integral of light received by said element during said time period corresponds substantially to the time-integral of light required to properly expose said film, whereby said film is properly exposed when said scene is illuminated by ambient light, and at least a portion of the light received by said film during said second fixed time results in an exposure error when said scene is illuminated by light from photoflash apparatus; and
compensating means selectively operable to so alter said functional relationship that termination of said time period is advanced by an amount sufficient to reduce said error when said scene is illuminated by light from photoflash apparatus.

9. In an exposure control device having an exposure aperture and shutter means movable with respect to said aperture to effect photographic exposures of a scene therethrough, a photoresponsive timing circuit operatively associated with said shutter means to control at least a portion of the movement thereof in response to electrical actuation by said circuit, said circuit comprising, in combination:
at least one photoconductive element arranged to receive light from said scene;
capacitive means connected in series with said photoconductive element;
means for applying a step function voltage to said capacitive means through said photoconductive element, whereby the charge on said capacitive means rises from an initial value to a predetermined value;
an output terminal between said photoconductive element and said capacitive means, whereby the charge on said capacitive means appears as the voltage at said output terminal;
means so arranged in said circiut as to actuate said shutter means for movement in response to said voltage reaching said predetermined value;
an electrical impedance; and
means for selectively connecting and disconnecting said impedance in series with said capacitive means on the same side of said output terminal thereas.

10. The invention according to claim 9 wherein said impedance comprises a fixed resistance.

11. An automatic exposure control device comprising, in combination:
shutter means movable from an initial blocking, to an unblocking, to a terminal blocking position with respect to an exposure therethrough;
manually operable means for actuating said shutter for movement from said initial blocking to said unblocking position;
a voltage-sensitive timing circuit having an output terminal and adapted to switch a current supply when the voltage at said terminal reaches a predetermined value;
means for actuating said circuit, in response to movement of said shutter away from said initial blocking position, to change the voltage at said terminal from an initial value to said preretermined value in a time interval dependent on the difference between said initial and said predetermined values;
means for actuating said shutter for movement from said unblocking to said terminal blocking position in response to switching of said current supply; and
compensating means selectively operable to reduce by a predetermined amount said difference between said initial and predetermined values, thereby reducing said time interval by a predetermined amount, when required to effect automatically an exposure of proper duration.

12. The invention according to claim 11 wherein said compensating means is operable to reduce said difference by increasing said initial value.

13. The invention according to claim 12 wherein said circuit is actuated by applying a step function voltage to capacitive means, the charge on said capacitive means appearing as the voltage at said output terminal, and said compensating means comprises an electrical impedance selectively connectable in series with said capacitive means.

14. The invention according to claim 13 wherein said circuit includes a photosensitive element arranged to receive light from the scene being photographed and having an electrical property which is functionally related to the intensity of said light, said photosensitive element being so connected in said circuit that said step function voltage is applied to said capacitive means through said element, whereby said time interval is also functionally related to said electrical property.

15. An automatic exposure control device comprising, in combination:
a first blade releasable for movement from a blocking to an unblocking position with respect to an exposure aperture to initiate an exposure therethrough, the time elapsing between release of said first blade and arrival thereof at its unblocking position being characterized as a first time delay;
a second blade releasable for movement from an unblocking to a blocking position with respect to said aperture to terminate said exposure, the time elapsing between release of said second blade and arrival thereof at its blocking position being characterized as a second time delay;
a timing circuit adapted to switch a current supply at the end of a time interval beginning with actutation of said circuit;
a photosensitive element arranged to receive light from the scene being photographed and having an electrical property functionally related to the intensity of said light, said element being so connected in said curcuit that said time interval is a function of said electrical property;
means for actuating said circuit in response to release of said first blade, whereby said time interval begins before said exposure begins by a time equal to said first time delay;
means for releasing said second blade in response to switching of said current supply, whereby said time interval terminates before said exposure terminates by a time equal to said second time delay;
means for so synchronizing movement of said blades that said first time delay is substantially equal to said second time delay;
means for so calibrating said circuit that the amount of light received during said time interval is substantially equal to the amount of light required to effect a proper exposure of a photosensitive material through said aperture, whereby said exposure will be properly effected when the amount of light received by said photosensitive element during said first time delay is substantially equal to the amount of light received by said photosensitive material during said second time delay; and
compensating means selectively operable to reduce said time interval by an amount substantially equal to said second time delay, whereby said compensating means may be made operable when the amount of light received during said second time delay is substantially greater than that received during said first time delay to effect termination of said exposure when the amount of light received is substantially equal to the amount required to cause switching of said current supply when said compensating means is inoperable.

16. The invention according to claim 15 wherein said time interval is established by applying a step function voltage through said photosensitive element to capacitive means to change the charge thereon from an initial to a predetermined value, said circuit being adapted to switch said current supply in response to said voltage reaching said predetermined value.

17. The invention according to claim 16 wherein said compensating means comprises an electrical impedance and is made operable by connection thereof in series with said capacitive means to increase said initial value of the charge thereon upon application of said step function voltage.

18. The invention according to claim 17 wherein said impedance comprises a fixed electrical resistance having a value which, when multipled by the value of said capacitive means, substantially equals said second time delay.

References Cited by the Examiner

UNITED STATES PATENTS 2,913,969  11/59  Faulhaber _____ 95—10
2,967,468  1/61   Bretthauer _____ 95—10
2,969,004  1/61   Gebele _____ 94—10

NORTON ANSHER, *Primary Examiner.*

JOHN M. HORAN, *Examiner.*

UNITED STATES PATENT OFFICE
CERTIFICATE OF CORRECTION

Patent No. 3,200,723                                               August 17, 1965

Jeremy M. Topaz

It is hereby certified that error appears in the above numbered patent requiring correction and that the said Letters Patent should read as corrected below.

Column 5, line 3, for "liks" read -- like --; line 12, for "it" read -- its --; column 7, line 33, for "deflect" read -- reflect --; column 8, line 16, for "point" read -- points --; column 16, line 54, for "exposure therethrough" read -- exposure aperture to effect an exposure therethrough --; line 65, for "preretermined" read -- predetermined --; column 18, line 1, for "synchonizing" read -- synchronizing --; line 40, for "multipled" read -- multiplied --.

Signed and sealed this 1st day of August 1967.

(SEAL)
Attest:

EDWARD M. FLETCHER, JR.                           EDWARD J. BRENNER
Attesting Officer                                            Commissioner of Patents